(12) United States Patent
Gupta et al.

(10) Patent No.: US 8,230,102 B1
(45) Date of Patent: *Jul. 24, 2012

(54) COMBINING AND SERVING MEDIA CONTENT

(75) Inventors: Manish Gupta, Santa Clara, CA (US); John Harding, San Fransico, CA (US); Stephen M. Lacy, Mountain View, CA (US); Willard Rusch, Woodside, CA (US)

(73) Assignee: Google Inc., Mountain View, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/217,786

(22) Filed: Aug. 25, 2011

Related U.S. Application Data

(63) Continuation of application No. 11/620,346, filed on Jan. 5, 2007, now Pat. No. 8,032,649, which is a continuation-in-part of application No. 11/428,319, filed on Jun. 30, 2006.

(60) Provisional application No. 60/756,787, filed on Jan. 6, 2006.

(51) Int. Cl.
*G06F 15/16* (2006.01)
*G06F 15/173* (2006.01)
*G06F 15/177* (2006.01)

(52) U.S. Cl. ............... 709/231; 709/219; 705/14.41

(58) Field of Classification Search .............. 709/203, 709/231, 217–228; 705/14.41
See application file for complete search history.

(56) References Cited

U.S. PATENT DOCUMENTS 8,032,649 B2 * 10/2011 Gupta et al. .......... 709/231

* cited by examiner

*Primary Examiner* — Haresh N Patel
(74) *Attorney, Agent, or Firm* — Fenwick & West LLP

(57) ABSTRACT

Systems and methods provide for dynamic generation of media content at the point that content is served. The system and method work within the bounds of simple, existing, open protocols and the media files served are playable by standard media playback clients. The method is driven by a request for media content from a client specifying an edit list. The server opens one or more source files and selects portions of one or more files to transmit based on edit list instructions, and sequentially writes those portions to an output for serving to the client. The server sorts the selected portions of one or more source media files, combines the selected portions to form a combined media shot, and serves the combined media shot to the client. The method allows for various modifications of the content before serving.

26 Claims, 9 Drawing Sheets

COMBINING AND SERVING MEDIA CONTENT

RELATED APPLICATIONS

This application is a continuation of U.S. patent application Ser. No. 11/620,346, now U.S. Pat. No. 8,032,649, filed on Jan. 5, 2007, entitled "Combining and Serving Media Content", which application is a continuation-in-part under 35 U.S.C. §120 of U.S. patent application Ser. No. 11/428,319, now copending, entitled "Dynamic Media Serving Infrastructure," filed Jun. 30, 2006, which claims the benefit under 35 U.S.C. §119(e) of Provisional Patent Application Ser. No. 60/756,787, entitled "Discontinuous Download of Video Articles," filed Jan. 6, 2006. This application is related to U.S. patent application Ser. No. 11/620,354, now U.S. Pat. No. 7,840,693, entitled "Serving Media Articles with Altered Playback Speed", filed Jan. 5, 2007; U.S. patent application Ser. No. 11/620,386, now U.S. Pat. No. 8,060,641, entitled "Media Article Adaptation to Client Device", filed Jan. 5, 2007; and U.S. patent application Ser. No. 11/620,468, now U.S. Pat. No. 8,019,885, entitled "Discontinuous Download of Media Articles", filed Jan. 5, 2007. All of the foregoing applications are incorporated herein in their entirety by reference for all purposes.

BACKGROUND

The present invention relates to display and modification of streaming and downloading media content, and more specifically, to serving dynamically created and modified streaming and downloaded media content.

Methods are known for streaming and downloading media content, for example, across the Internet from a server to a client device in response to a client request for media content. Existing technology uses a traditional static file serving interface, in which a complete file is served to a client. These technologies serve either entire files or client-requested byte ranges of files. The file is usually stored or cached on the server for playback. Typically, if a user wants to view media content in this manner, a specialized client player application for playing the media content must be downloaded and installed on a client system. The server and client player application then use specialized protocols, file formats, and video encodings to transmit, decode and playback the media content.

SUMMARY

The present invention provides various embodiments of methods and systems for serving media content. The system provides for dynamic generation of media content on-the-fly from a corpus of indexed media source files before serving to the client. The system stores the source files such that portions can be accessed, allowing for dynamic sequencing, interleaving, and modifying the content on the server to create a new file portion, or "shot," for serving to the client. File portions are ordered sequentially, and each portion can be sent to the client following the order, without having to wait until the entire new shot is formed.

A client requests media content from a media server, the request including a list of media source files and an edit list. The edit list comprises a set of instructions for various methods of combining and/or modifying one or more media shots. The server opens one or more source media files, parses these files, and selects frames or other portions to transmit based on the edit list, and sequentially writes those portions to an output file for serving to the client. The server also uses the edit list to sort the selected frames or portions and combine the selected frames or portions to form new combined media content; the server then serves the new combined media content to the client. This approach allows for dynamic modification of the content after the time it is requested and before serving, thereby allowing for modification such as audio and video splicing and editing, real time ad insertion, encryption, changing the rate of served content (e.g., speeding up or slowing down), and other transformations or alterations of the content.

BRIEF DESCRIPTION OF THE DRAWINGS

FIGS. 8A-8C show examples of use cases for the method described in FIG. 7.

The figures depict various embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE EMBODIMENTS

Described herein is a method and system for serving media. Media content, as used herein, refers to any type of video and audio content formats, including movie files, i.e., files including both video and audio content, as well as audio-only formats, and may include any form of audio, video, metadata, or combination thereof. A common example is a video article including two content streams, one video stream and one audio stream. However, the techniques described herein can be used with any number of file portions or streams, and may include metadata.

Figure 1:
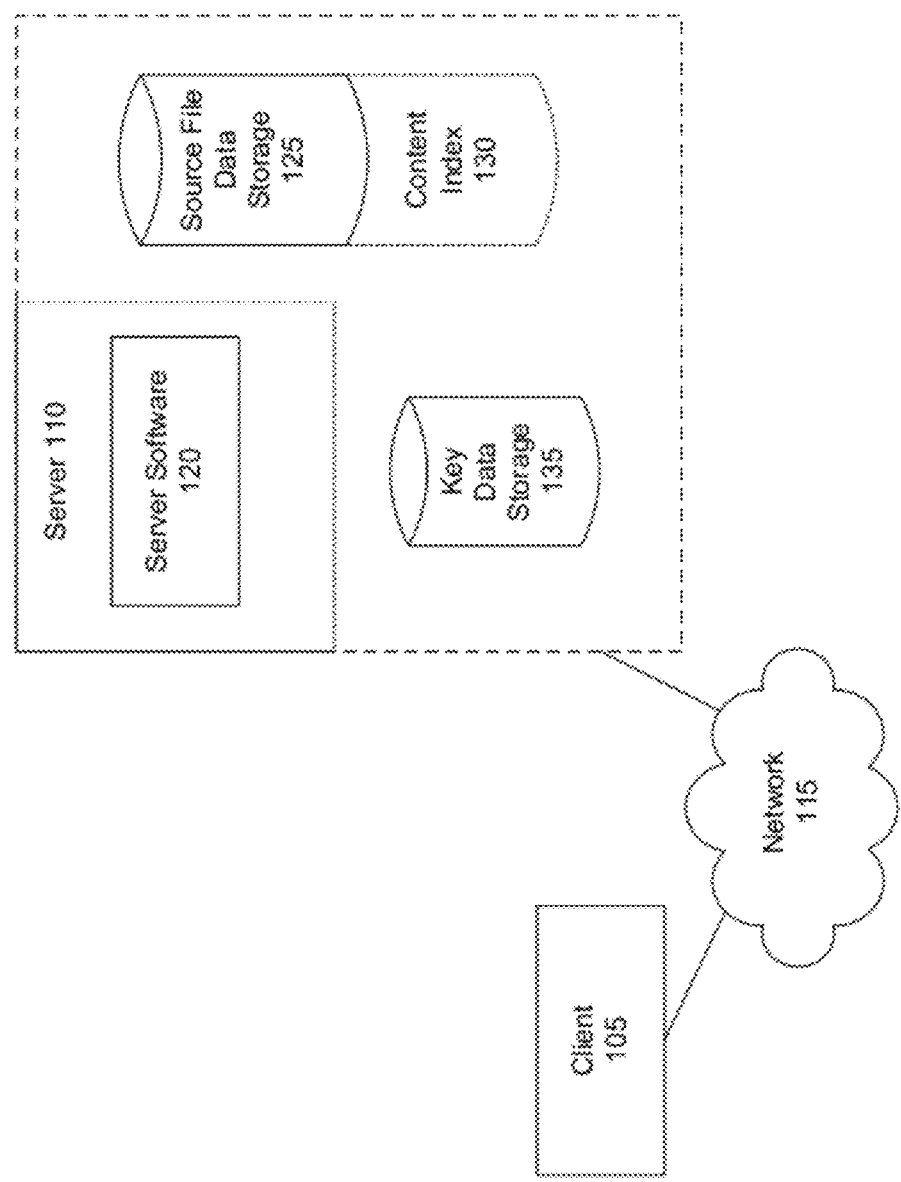
FIG. 1 is a block diagram illustrating a client-server architecture according to one embodiment of the present invention.

The various embodiments of the invention can be implemented in the context of a standard-client server architecture. FIG. 1 is a block diagram illustrating a client server architecture suitable for this purpose. Such as system comprises a client 105 and a server 110, communicatively coupled, e.g., by a network 115. The client 105 can be any type of client computing device, for example, a device executing a browser application or other application adapted to communicate over Internet related protocols (e.g., TCP/IP and HTTP) and/or display a user interface though which media content can be output. According to one embodiment, the user interface of the client 105 allows a user to view, manipulate, and select media content portions and sequence them to form the basis for an edit list as descried herein. The client 105 includes a processor, an addressable memory, and other features (not illustrated) such as a display adapted to display video content, local memory, input/output ports, and a network interface. The network interface and a network communication protocol provide access to a network 115 and other computers, such as server 110 or third party computers, along with access to the Internet, via a TCP/IP type connection, or to other network embodiments, such as a LAN, a WAN, a MAN, a wired or wireless network, a private network, a virtual private network, via other networks, or other systems allowing for data communication between two or more computing systems, as well as through a combination of networks (e.g., accessing the server via a bridge from a cellular or wireless networking system to a TCP/IP system). In various embodiments the client 105 may be implemented on a computer running a Microsoft Corp. operating system, an Apple Computer Inc., Mac OS, various flavors of Linux, UNIX, Palm OS, and/or other operating systems. While only a single client 105 is shown, the system can support a large number of concurrent sessions with many clients 105.

In one implementation, the system operates on high performance server class computers 110. The details of the hardware aspects of servers 110 are well known to those of skill in the art and are not further described herein. The server 110 is depicted in FIG. 1 as a single computer system, however, the system may be implemented as a network of computer processors and associated storage devices. Examples of server devices 110 are servers, mainframe computers, networked computers, a processor-based device, and similar types of systems and devices. The server 110 and its associated storage devices need not be physically co-located, and there need not be any predefined mapping between storage devices and server computers. The server processor can be any of a number of well known computer processors, such as processors from Intel Corporation of Santa Clara, Calif. and Motorola Corporation of Schaumburg, Ill. In one embodiment, the server 110 has sufficient processing power and bandwidth to perform modifications of content prior to serving as described herein. The network 115 may comprise the Internet alone or in combination with other networks, wired and wireless, such as an intranet, a local area network, a wide area network, or a broadcast network according to various embodiments.

Figure 2:
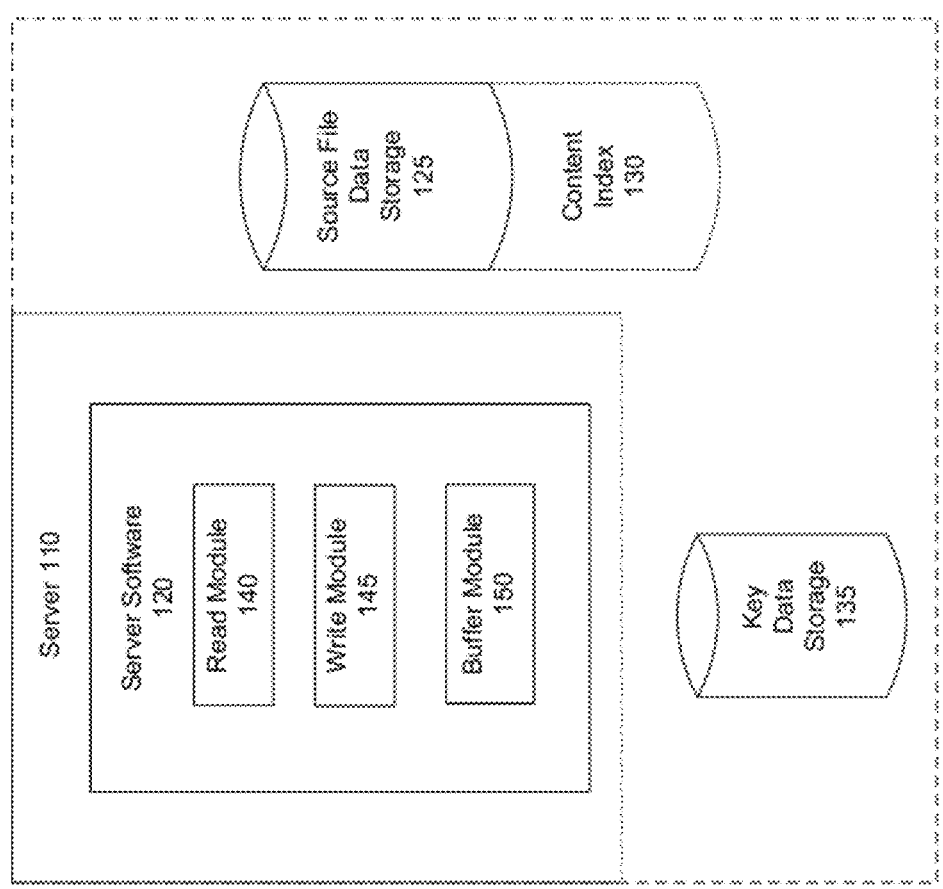
FIG. 2 is a block diagram illustrating the server in greater detail.

FIG. 2 is a block diagram illustrating one embodiment of the server 110 in greater detail. Here, the server 110 includes server software 120, source file data storage 125, a content index 130, and a key data storage 135. The source file data storage 125, content index 130, and key data storage 135 may also be separate from, but accessible by, the server 110, and/or form a single data store. The server software 120 is comprised of a number of executable code portions and data files. These include code for enabling the methods described herein. The server software 120 is responsible for orchestrating the processes performed according to the methods of the present invention. The server software 120 includes a read module 140, a write module 145, and a buffer module 150. The read module 140 is one means for enabling the system to use one or more read threads to read portions of a stored file. The read module 140 controls the source media file access, processing, header formation, content reading, content modification, footer construction, and writing to the output as described herein. The write module 145 is one means for enabling the server 110 to control the writing of data from the output (network transmit buffer) to the network 115. The buffer module 150 is one means for enabling the system to prepare data for writing to the network by placing it in a network transfer buffer. The buffer module 150 controls the functioning of the network transfer buffer. The above software portions 140-150 need not be discrete software modules. The software configuration shown is meant only by way of example; other configurations are contemplated by and within the scope of the present invention. These aspects of the present invention allow the server 110 to serve media content directly from stored content, without the need to duplicate content for serving. In addition, the media files served are playable by standard media playback clients.

Stored media content can be previously received from a client 105 as a result of being uploaded by a user. In another embodiment, the media content is from one or more other sources, for example television content. Once the media content is received at the server 110, the media file is transformed into a serving format. In this example, transforming into the serving file format includes processing the media file, identifying the indexable portions within the media file, enumerating and assigning each frame a timestamp, parsing the media file headers and footers, and computing format-specific "chunk" boundary points based on the indexable file portions, or chunks. The media content is stored in a source file data storage 125, and data about the media content is stored out-of-band from the media content in a content index 130, which can be queried using a content identifier. A content identifier is an arbitrary binary identifier that uniquely identifies a single piece of stored media content and data about the media content, e.g., a 64-bit hash value computed from attributes of the stored media content, any unique string of characters, or a unique number assigned to this content at the time it is created. The content identifier is used to anonymously reference media content instead of using file names, e.g., to provide greater privacy and security. The size of a portion of a file, or chunk, varies from the very small to the very large. The size of the portions of a file determines the granularity available for the editing of the file. The number of chunks stored per media stream is limited only by the size and speed of the storage mechanism used, and by the amount of acceptable metadata storage size per media file. Systems with smaller sized storage would choose a longer interval for chunks, thus reducing the storage overhead for each media file. Systems with large amounts of fast storage could choose chunk sizes down to the individual frame granularity. Preferably, the ratio of the size of the metadata to the size of the media file is small, e.g., less than 1%. Alternatively, a static size for the metadata, such as 64 kB, could be used.

The source file data storage 125 may be a relational database or any other type of database that stores the media content data according to one embodiment. Media content on the server may be received from various sources in various (e.g., compressed or uncompressed) forms. A media article can be stored in various ways and formats. For example, a media article can be stored as a file or other data in a database or other storage medium. A media article can comprise, for example, video content stored in any format, such as Moving Picture Experts Group (MPEG-2, MPEG-4), Windows Media 9 (Windows Media High Definition Video), Video for Windows (AVI), QuickTime, Indeo, etc., as well as in any resolution (e.g., HD or SD), or signal format (e.g., National Television Standards Committee (NTSC), Phase Alternating Line (PAL), Systèm Electronique pour Couleur avec Mémorie (SECAM)), or any other suitable video content of any format and standard whatsoever. The media articles may be suitable for broadcast and/or made available on a network (such as the Internet), a personal computer, or other computing or storage means, and may include other data associated with the video content such as program guide information, metadata, and closed captioning text. The embodiments described herein are described generally in relation to video content, and thus are referred to as video articles, but embodiments may operate on any suitable type of content, including audio-only content.

Figures 5A, 5B:
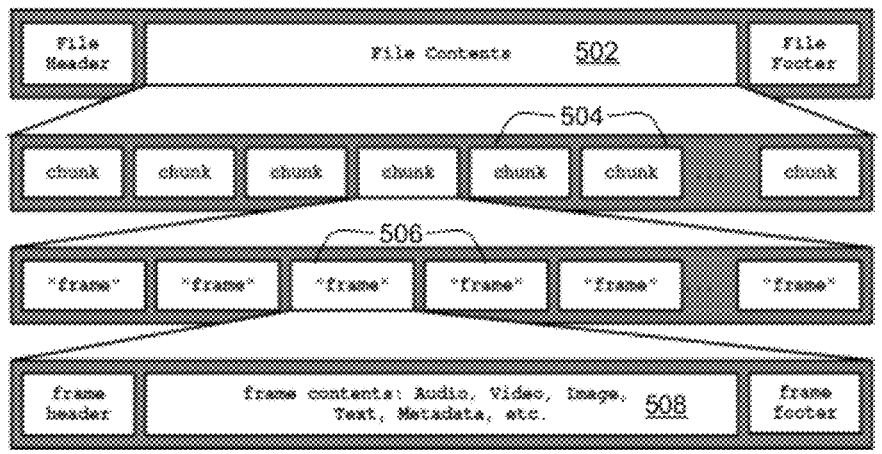
FIG. 5A is an illustration of a file format.
FIG. 5B is an illustration of a sample AVI file.

A generic container file format is used to encapsulate the underlying video or audio data. An example container file format according to one embodiment is shown in FIG. 5A. The example generic file format includes an optional file header followed by file contents 502 and an optional file footer. The file contents 502 comprise a sequence of zero or more chunks 504, and each chunk is a sequence of "frames" 506 (or groups, as described herein). Each frame 506 includes an optional frame header followed by frame contents 508 and an optional frame footer. A frame 506 (or group) can be of any type, either audio, video, or metadata according to one embodiment. In other embodiments, this model may be used for other file types, for example, Adobe Post Script™, PDF, mp3, or other custom file types. For temporal media, e.g., most audio or video, frames are defined by a specific (e.g., chronological) timestamp. For non-temporal media, frames are defined by any monotonically increasing value, e.g., page numbers of a PDF document. A frame or group 506 includes one or more streams of content. A stream refers to a set of frames identified by the containing file format. For example, a file may contain zero or more video streams, and zero or more audio streams. Each frame 506 has an identifier that marks it as being part of at least one stream. Some formats implicitly define streams based on frame format types.

Each frame 506 may be a keyframe according to one embodiment, as defined by the video encoding format and encoding parameters used. The media file must include one or more keyframes, and chunks may contain zero or more keyframes. Key frames are used, in part, to define segments of media content from which playback can begin. However, many audio formats do not have this feature, and can be segmented on individual audio frame boundaries. For each frame 506, a timestamp can be computed. A timestamp need not necessarily correspond to a physical time, and should be thought of as an arbitrary monotonically increasing value that is assigned to each frame of each stream in the file. For example, as referenced above, the monotonically increasing value as applied to a PDF file would correspond to a page number. Thus, the use of the term "timestamp" is used herein in this broader context. If a timestamp is not directly available, the timestamp can be synthesized through interpolation according to the parameters of the video file. Each frame 506 is composed of data, typically compressed audio, compressed video, text meta data, binary meta data, or of any other arbitrary type of compressed or uncompressed data. Various container file formats may be used. An AVI file is described below as one possible container file format, however, other container formats, e.g., ASF, etc., may be used.

In one embodiment, an AVI file is used to store the media article. FIG. 5B shows sample AVI file contents according to one embodiment. In this example, the AVI file includes a header 505 including basic information about the segment, e.g., width, height, video format, audio format, number of video frames, number of audio frames, length of video frame, etc. The bulk of the file lists byte content information 510. In addition, the file ends with a footer 515 including information about byte offsets, etc. In this example every frame is a key frame.

The content index 130 may be a relational database or any other type of database that stores the indexed data corresponding to the source file media according to one embodiment. Here, the content index 130 includes a content identifier, the number of file portions or streams and stream types within the media file, the file content offset in bytes, the file footer offset in bytes, stream-specific information (e.g., frame rate, format, width, height, duration, etc.), file-format specific flags, and a file format identifier. In this example, the indexed data is available as a result of the above-referenced transforming operations. In addition, other information from the received video file (e.g., width, height, audio and video frame rate, audio and video duration, file format, audio and video codec, etc.) may also be stored in the content index 130. Media content is stored in source file(s) in a plurality of separately indexed portions. "Portions," as used herein refer to any segments or fragments of a file, and includes frames, chunks, groups, segments, or other portions defined herein.

The content index 130 is a file-format specific data structure, that includes relevant information from the source media file headers and footers, as well as overall file information, such as described above. The content index 130 may be structured as a set of sorted lists, tables, trees, or other implementations. The content index 130 stores the media segmented into chunks, which are logical units representing indexed portions of files and identifying the location of the frames in the chunk. In other words, each media file is associated with some number of chunks, which can then be arbitrarily and independently accessed and manipulated. Similar to the file structure depicted in FIG. 5A, each chunk has its own file name for internal data access, and includes a set of frames and/or groups. Each chunk is associated with a row or portion thereof in the content index 130 that represents a single media file. Each row has a maximum size of 64k bytes, and is identified by a row identifier, which is a hash of the content identifier and an identifier for the video encoding format and resolution. In this example, the row identifier includes multiple columns to specify the content index 130 data as discussed herein. Alternatively, all data for all chunks of a media file is stored in a single database row, using one or more columns. For each chunk, a chunk index stores a chunk identifier number, chunk byte offset (from the start of the file associated with the chunk), chunk length in bytes, chunk start timestamp, chunk end timestamp, and for each stream in the chunk, a stream frame number, stream frame count, stream starting timestamp, and stream ending timestamp. This aspect of the present invention allows a given media file to be represented as a number of individual chunks, which can then be stored separately or together, so as to optimize read and write performance. Further separation of chunks into frames, groups, or other file portions allows the various file operations (transcoding, resolution, etc.) to be performed on the frame or group level, allowing the system to make changes at this level of granularity.

The content index 130 maps from content identifier and time to file name, byte offset, and (video, audio) frame number and/or group number. The mapping is created when media content is received by the server; the mapping is stored in the content index 130 in association with the row for a given media file. The mapping maps a specific time index point in both the video and audio feeds to a specific byte in the source file. Byte offsets are relative to the start of an audio or video frame according to one embodiment, and the content index 130 itself is stored in a format that is file-agnostic with the specific file format and codec stored as metadata in the index 130. Thus, the content index 130 provides an indication of the relative location of a time index point in the original file, and exactly what content (e.g., audio and video) is stored at that byte.

Time to byte mappings exist for every video key frame in one embodiment. In other embodiments, time to byte mappings exist for every audio frame and video frame in the video article, for every N frames in the video article, or for every N video key frames, without limitation as to size (number of items in the mapping) of the information. The mapping from time to offset preferably maps to the nearest group. Most compressed video formats have the notion of a group of pictures ("GOP," "group"), which can be thought of an atomic set of video frames. This set of video frames cannot be cut at any point without decoding and re-encoding the video. Therefore, the media content may take advantage of this design, and be addressed at the group level rather than the frame level. Typically, audio formats do not have groups, and can be cut on individual audio frame boundaries. Each frame or group is sorted by time, and includes a start time, audio and/or video frame number, and byte offset. In other words, for any given time point (or range of time) in a media file, the content index 130 can be used to determine the specific chunk(s) that are associated with that time, and the specific frames thereof, and thereby retrieve them as needed.

The key data storage 135 may be a relational database or any other type of database that stores the data corresponding to keys for encrypting data within a URL. The key data storage 135 may be accessible by the server software 120 through a user interface.

The server software 120, the source file data storage 125, content index 130, and key data storage 135 may be stored and operated on a single computer or on separate computer systems communicating with each other through a network. The server 110 can store the media content either locally, or on remotely accessible systems, or a combination of both.

One skilled in the art will recognize that the system architecture illustrated in FIGS. 1 and 2 is merely exemplary, and that the invention may be practiced and implemented using many other architectures and environments.

Figure 3:
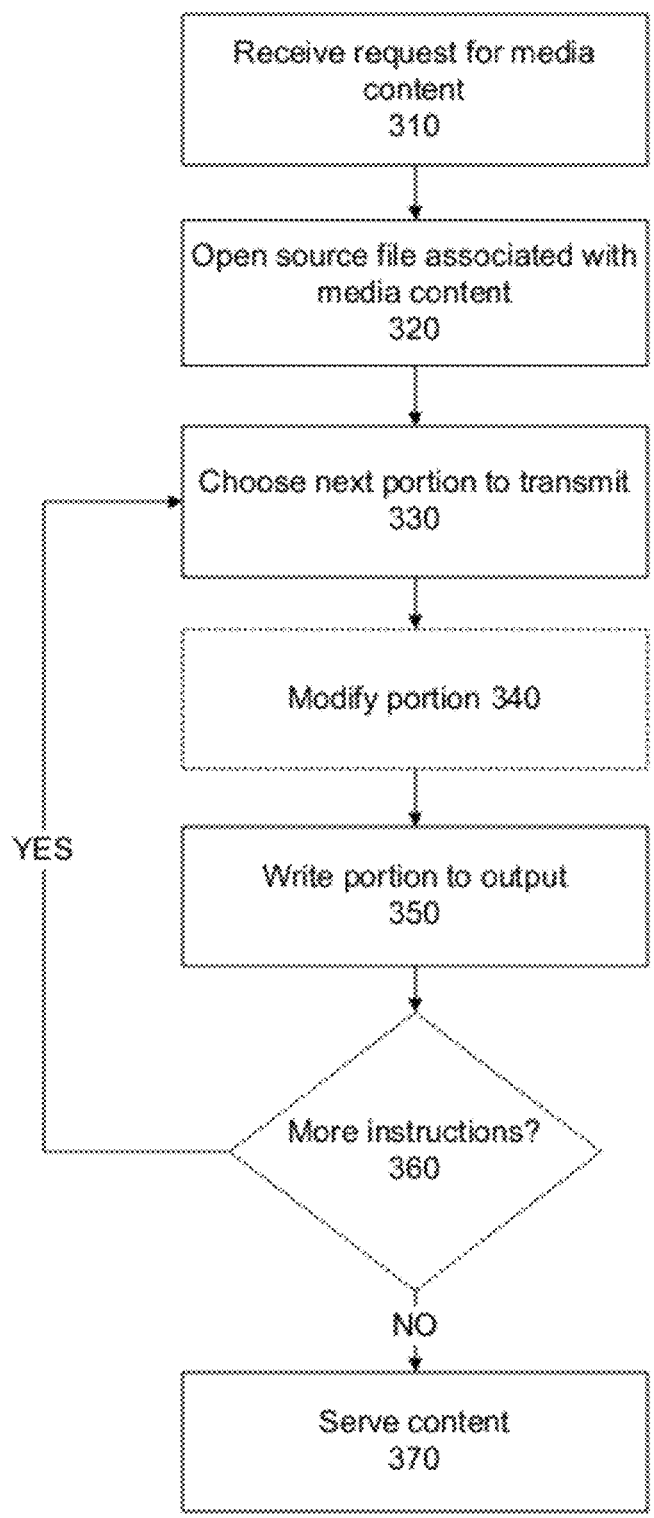
FIG. 3 is a flowchart illustrating a method for serving media content.

As mentioned above, the present invention operates in the context of an information retrieval system for processing queries for video content. FIG. 3 is a flowchart illustrating one method for serving media content. The method begins when a request from a client 105 is received 310 for media content stored on a server 110. The request is received at a network interface to the server 110. The request to the server 110 includes the content identifier for the content that the user desires to play back, the resolution at which to play the media content, and a time range, specified as the starting time (in milliseconds, or another time unit, into the content) and length (in milliseconds or other units). The content identifier is an arbitrary binary identifier that uniquely identifies a single piece of stored media content and data about the media content, e.g., a 64-bit hash value computed from attributes of the stored media content, any unique string of characters, or a unique number assigned to this content at the time it is created. The content identifier is used to anonymously reference media content instead of using file names, e.g., to provide greater privacy and security. This aspect of the present invention is advantageous because it allows for time-based requests from clients, rather than traditional byte-based requests.

The request also includes an edit list. An edit list, as used herein, refers to a list of dynamic or static instructions for serving and editing stored media content. Edit list instructions can be added either by the client 105, the server 110, or both. For example, given an edit list received from the client 105, the server 110 can pre-pend, append, or insert additional instructions into the client-requested content, or can modify the length, rate, number of streams, file wrapper format of the content. The edit list instructions can range from the very simple serving of an entire source file, to more complicated modifications, including serving a portion of a source file, serving more than one portion of one or more source files, changing the rate at which a source file or portion is served (speeding up or slowing down), adapting the rate at which a source file or portion is served to the client capabilities, encrypting a file or portion, adding or removing streams from the file or portion, interleaving streams from different files or portions, adding a data stream to a file or portion, transforming a file wrapper format, transforming from a proprietary file format to a standards-compliant format, inserting metadata into the file or portion, and various other modifications according to one embodiment. Other possible modifications include changing stereo audio into monophonic audio, changing color video into black and white video, reducing the resolution of a video stream, reducing the resolution of a still image stream, performing various visual algorithms on video or still images streams (sharpening, blurring, distorting, crossfade, etc.), and performing various audio algorithms (changing sample rate, pitch shifting, rate adjusting, echo, flange, etc.) according to various embodiments. Examples of ways to accomplish these modifications are included in the following description. The edit list that is provided in the request also may include an identifier which indicates that further instructions should be generated and included. These extra instructions may be generated by the server, or received from any machine connected to the server. Thus, the complete edit list need not be specified in the request, but can be generated internally at the time the request is received. This process allows every user to be provided with a unique media stream in response to the unique request.

The details of the request can be generated automatically or programmatically. The user is not required to specifically input the request details.

A request may be for content from a single media source file, an altered (e.g., truncated) version of the media content, or a combination of pieces from different media source files. For a request that includes more than one portion of one or more files, the request includes more than one time range, and the server 110 queries the content index to find the chunks that lie nearest to the requested timestamps according to one embodiment.

Figure 4A:
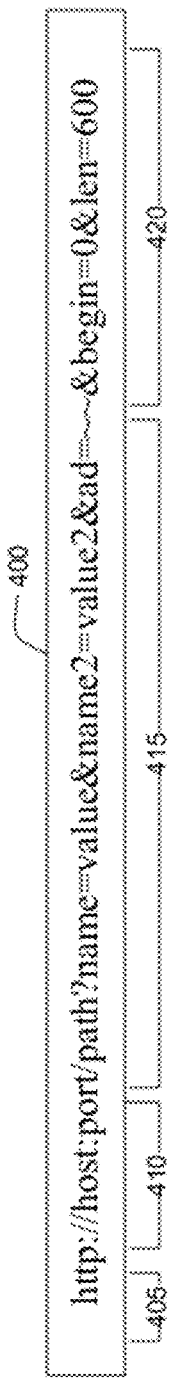
FIGS. 4A-4C illustrate possible uniform resource locators.
Figure 4B:
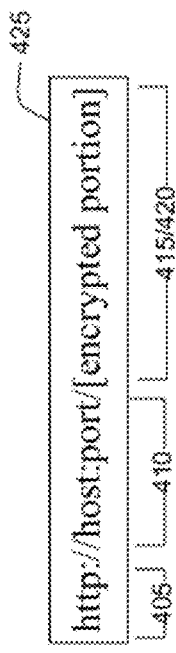
Figure 4C:
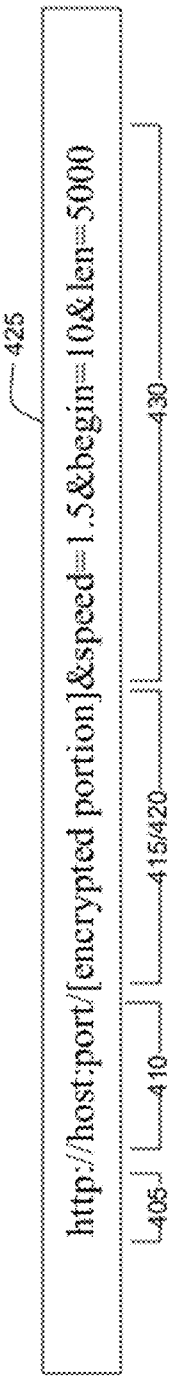

The request is a hyper text transfer protocol (HTTP) request (or similar transport protocol), and takes the form of a uniform resource locator (URL) 400, as shown in FIG. 4A. The URL 400 is in the typical format, including a protocol 405, a host (and port, if applicable) 410, and a resource path and/or query string 415. In addition, an edit list 420, in the form of instructions for performing operations on one or more files, is included. FIG. 4A shows a simple example, in which a time range is the only parameter. In some embodiments, part of the URL 400 is encrypted as descried herein. FIG. 4B shows an example of an encrypted URL 425. In embodiments in which the URL is encrypted, the client cannot modify the encrypted portion, but can add modifications on to the URL, for example, to speed up the rate or to request a smaller subset of the media content. FIG. 4C shows an example of an encrypted URL with additional edit list instructions 430 appended. In this example, an instruction has been added to speed up the rate for the content (to 1.5 times normal speed) and to select the time range 10 to 5000. The modification permitted by the client 105 does not alter the encrypted portion according to one embodiment. For example, if the file size is 1000, the request for 10 to 5000 may automatically be adjusted by the server to the available time range.

Once a request is received 310, at least one source media file corresponding to the media content requested is opened 320. To do this, the request is passed to a read thread, which does asynchronous lookups to the content index 130 using the content identifier, computes starting byte offsets and frame lengths from the specified time range, and then opens 320 the source media file. In one embodiment, if more than one portion will be combined or more than one stream interleaved, the server 110 sorts the content items in the order in which they will be transmitted prior to reading the content index for all content items associated with all portions. In addition, the server 110 stores the relevant header and footer information, such as video resolution and frame rate, byte range of the portion of the file that is being composed, and other file format specific information. If a data stream is being added, the server 110 also reads content index information for a data stream, which includes a list of time-stamped data objects to be inserted in the stream. The time-stamped data objects can be arbitrary binary data, text data, or any other format.

In addition, a new file header is created from the information stored in the content index 130 according to one embodiment, which is written to the output. In one embodiment, the server 110 looks at the content index 130, reads the header information, and constructs a segment media header representing the requested time range. The server 110 computes the number of audio and video frames that will be transmitted during this request. If more than one portion is being used, the server 110 computes the total number as the sum of frames from all content items that will be transmitted. If the content is being sped up or slowed down, the number of frames that will be transmitted will be different from the number of frames in the source media file(s). The server 110 also appends data specifying the original byte range and (video and audio) frame numbers according to one embodiment. If the data is being encrypted, the header may contain encryption keys, user identifying marks, or other information that allows the client to decrypt the encrypted data that follows. If the file wrapper is being transformed, the server 110 composes a valid file header, according to the "new" wrapper format (e.g., the format into which the wrapper is being transformed). If the wrapper transformation is from a proprietary format to a standards-compliant format, e.g., the original wrapper format is a format that is not standards compliant, and the new wrapper format is a standards compliant one.

Once the file is opened 320, some or all of the file contents are read.

To reconstruct a media file in the same file format as the original source, the byte offsets of the first and last video and audio frames (or groups) of interest, as well as the number of video and audio frames in the segment, as well as any other metadata that may be useful to clients, are located. In addition, a new header (and footer, if applicable for the format) is created and spliced together to construct the output file.

A separately indexed portion of the media content is then selected 330 for transmitting based upon an instruction in the edit list. In one embodiment, the selecting 330 is part of a loop of reading from the source media file(s), and writing that data to the output. Once selected 330, the server 110 finds the byte range in the original media source file and reads that region. In one embodiment, the output is a network transmit buffer. The network transmit buffer stores data ready for output to the network, for serving to the client according to one embodiment.

Optionally, the server 110 next modifies 340 the portion. Various modifications are possible; each modification is listed as an instruction in the edit list. Each modification step may or may not be length preserving, and thus the frames and other portions may be of any length after each step of the modification process. One possible data modification is data encryption. The contents of each frame or portion are encrypted with a per-request generated key. To accomplish this, the server 110 looks at each frame of this content, applies a standard encryption algorithm to some or all of these frames, and modifies the frames in a way that clearly delineates them as being encrypted before writing the encrypted data to the output. The keys are stored, e.g., in key data storage 135, such that they can be retrieved later for decryption purposes. The use of encryption allows for insertion of additional data, e.g., ad targeting information. Another possible data modification is a rate change to a rate different from the original encoding rate. For example, a user can request a "fast forward" stream or portion that sends a file that will play back faster than the original content. To accomplish fast forward, in one embodiment frames are selected to be "dropped" from the source file, while the remaining frames are written to the output as normal, or with their timestamps adjusted accordingly. For example, for each video frame, the frame is either discarded or written to the output. The requested speedup factor and the specifics of the video encoding determine how many frames need to be discarded, and which frames may be discarded. The server 110 also needs to construct a valid audio stream that matches the rate of the video stream. The audio stream is constructed, e.g., by using a precomputed "silence" audio track in place of the original audio, doing more sophisticated audio processing to adjust audio rate to match the new video rate, or discarding a fraction of the original audio frames.

Another example is a "slow motion" stream or portion that will send data to be played back at a lower rate than the original source. To accomplish slow motion, frames are selected for duplication, or "padding" frames are added to automatically duplicate frames. For example, for each video frame, the frame is either transmitted intact, or a format-specific marker is placed in the file to duplicate the previously transmitted frame. The requested slow down factor and the specifics of the video encoding format determine how many frames need to be duplicated, and which frames may be duplicated, as well as the bytes that should be sent to mark duplicate frames. As with speeding up the content, the server 110 also needs to construct a valid audio stream that matches the rate of the video stream, e.g., as described above. Another possible rate change modification is an adaptive bit rate. To accomplish this modification, the server 110 determines whether the client 105 is able to receive the video at a rate sufficient to be decoded in real time. For example, the rate at which the client reads from the output is monitored throughout the request. If the rate at which the client is reading is less than the encoded rate of the video, the server 110 may replace the original encoded video frame with a significantly smaller, dynamically created frame that tells the video decoder in the client to duplicate the previous frame onscreen. In another embodiment, the server 110 applies an algorithm to modify the original encoded video frame to create a new frame of a smaller size. This algorithm may include a full or partial decode of the original video frame, as well as a full or partial re-encode of the video frame. This process reduces the overall transmitted audio and video rate.

Another possible data modification is selection of data streams or other file portions from within a file. For a data file that includes multiple streams of content, the server 110 can dynamically choose not to send some of the streams. For example, a data file may contain one video stream and three audio streams. At the time the file is sent, one of the three audio streams is chosen for sending with the video stream. For example, the server 110 reads correct byte range from the first file, and writes this to the output, and then repeats this process for subsequent files until each content item has been read and written to the output. Yet another possible data modification is stream interleaving or data interleaving. The server 110 interleaves data from one or more files together to create a new, dynamic piece of content. For example, the server could choose to overlay an audio stream from one file with video stream from another file. In this example, the server 110 reads chunks simultaneously from each file, then takes each video and audio stream pair, and applies a file format specific stream marker to each matched pair of audio and video. It then sorts all of the frames by their representative timestamps, and writes this data to the output. If the number of audio and video frames is different between the streams, then the server 110 may pad the video with empty video frames, black video frames, or some other file format specific construct. A similar padding operation may be used for audio streams. This process ensures that the total duration of video and audio content is identical in each stream. Another example of data interleaving is mixing a text or metadata stream, e.g., closed captioning or promotional data, with an existing audio and/or video stream. To add a data stream, the index information for the data stream, e.g., the byte range, is gathered and transformed into a format suitable for inclusion in the resultant media file. The video frames and data stream frames are then sorted by their internal timestamps, and each frame is subsequently written to the output. This process results in an effective interleaving of the data and video streams, and the data stream will be synchronized correctly with the video and audio streams. In one embodiment, the added data is metadata dynamically computed by the server. The metadata may be data that is not useful to the user, and is consumed by the playback client.

Another possible data modification is data wrapper transformation. Different computers and operating systems support different file wrapper and frame wrapper formats. For each source file, the frame header and footer specific to the original format are discarded, and generate new headers and footers that are specific to a desired file format. For each frame contained in this data, the server 110 parses the data according to the original wrapper format, extracts the compressed video or audio data, and then encodes this data using the "new" wrapper format, and writes this byte range to the output. Yet another possible data modification is calculated data insertion, wherein data is generated on the fly and inserted into the served file according to one embodiment. For example, a new "stream" is created and specified in the file header, and this stream is transmitted by the server. In this example, the new stream includes data transmission statistics, popularity statistics, or other computed metadata according to various embodiments.

In addition, for each frame, various types of audio and/or video processing may be applied, e.g., using one or more processing algorithms. The algorithm(s) may operate directly on the encoded video to create the desired video effect. Or the server 110 may do a partial or full decode of each video frame, apply an arbitrary video transformation on the partially or fully decoded video and then do a partial or full encode to produce the resultant frame. Each audio frame may be processed in a similar manner. Video processing and enhancement algorithms are well known, and include such things as color to black and white transformation, sharpening, blurring, arbitrary distortions, resolution reduction, and blending effects between one or more video streams. Audio processing steps include such things as sample rate changes, pitch shifting, bitrate adjustments, echo, flange, crossfade, converting to monaural, and dynamic range compression.

In some embodiments, a per-frame transformation is applied to make the file appear consistent. The timestamp of the output video article is updated so that the first frame is timestamp 0 and increases over time according to some embodiments. Although the time durations of video and audio frames are often unequal, because separate video and audio time offsets are stored in the content index 130, there is as little offset as possible between video and audio frames. Thus, no re-muxing of video and audio frames is required (but is possible, if desired). According to one embodiment, the server 110 also has the ability to dynamically modify data by chaining together multiple modifications for the same piece media content. These aspects allow insertions, deletions, and other modifications to be made at the time of serving the media file portion.

Once any modifications 340 are made to the portion, the portion is written 350 to the output. Then, optionally it is determined 360 whether more instructions apply for the requested media. If the edit list includes additional instructions, steps 320-350 repeat according to the next instruction in the edit list.

In one embodiment, the server 110 next constructs a footer that includes an index of relevant information from the original media source file and writes the footer to the output. In one embodiment, a region of the source file footer is read, modified, and placed in the network transmit buffer. If greater than one file portion is to be included in the served content, a region of the first source media file footer is read first, then subsequent files in series. If the data wrapper is being transformed, the server 110 parses the footer according to the original wrapper format, and modifies the footer to be consistent with the new wrapper format. As with the header, if the transformation is from a proprietary format to a standards-compliant format, the original wrapper format is a format that is not standards compliant, and the new wrapper format is a standards-compliant one.

Up to this point, the steps at the server 110 have been performed by a single read thread according to one embodiment. A separate thread, a write thread, controls the writing of data from the output (network transmit buffer) to the network 115 for serving to the client. The write thread determines whether there is data in the network transfer buffer. If there is, the data is written to the network. If there is no data in the network transfer buffer, or the buffer is nearly empty, the write thread asks for more data, i.e., from the above process by the read thread.

Figure 6:
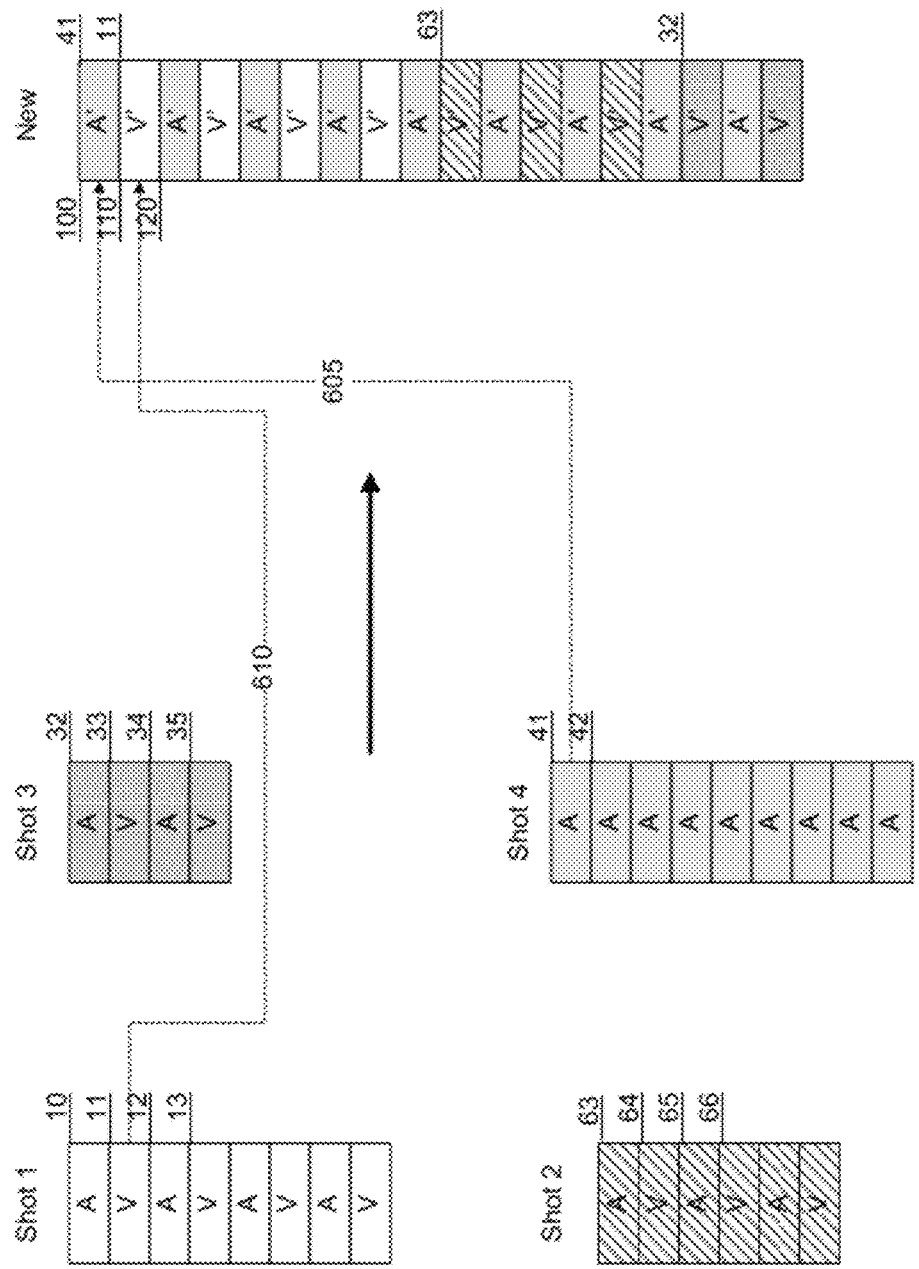
FIG. 6 shows an example of a use case for the method described herein.

FIG. 6 shows an example of a use case for the method described herein according to one embodiment. In this example, streams from different file portions are interleaved. As a preliminary step, a user uploads one or more pieces of media content ("shots") to a server, e.g., via a user interface. In this example, the user uploads media content including shots 1-4. The media content is transcoded on the server into the serving format. Then, using a user interface, the user selects, edits, and arranges the content into the format desired for viewing. In this example, the user wants to create a new piece of media content that includes a portion of the video from the content associated with shots 1-3, i.e., the portion shown as shots 1-3, with a portion of the audio associated with shot 4, i.e., the portion shown as shot 4. The user interface software converts the instructions into an edit list as part of a request from the client for the edited content, which is sent to the server. After the steps detailed below, the client will receive from the server a single piece of content edited per the request.

The server receives the request from the client, in the form of a URL as described in conjunction with FIGS. 4A-C, which includes the content identifier for each piece of content that the user desires to play back, in this example shots 1-4, and the resolution at which to play the content. The request also includes a time range for each shot, specified as the starting time (e.g., in seconds into the content) and length (e.g., in seconds). For example, for shot 1, the starting time is 10 seconds (begin=10) and the length is 8 seconds (len=8). The request also includes an edit list that refers to a list of instructions for interleaving the four streams from shots 1-4, such that the new piece of content includes the video of each of shots 1-3 and the audio of shot 4.

As discussed in conjunction with FIG. 3, the source media file corresponding to the media content requested, in this example, corresponding to each of shots 1-4, is opened. To accomplish this step, the request is passed to a read thread, which does asynchronous lookups to the content index using the content identifiers, computes starting byte offsets and frame lengths from the specified time ranges, and opening each file. The read thread also creates a new header for the new content.

Following the instructions in the edit list sequentially, a next frame of the media content is selected for transmitting. In this example, the server interleaves data from four files together to create a new, dynamic piece of content. Specifically, the server selects an audio stream from one file (shot 4) to interleave with the video streams from three other files (shots 1-3).

In this example, the audio frame of shot 4 with timestamp "41" is selected 605 for transmitting and is written to the network transfer buffer, as illustrated in FIG. 6. Next, the video frame of shot 1 with timestamp "11" is selected 610 and written to the output buffer. The read thread continues to select the next frame in sequence until completing the last instruction in the edit list. The frames are renumbered such that the timestamps associated with the newly created piece of content increase monotonically from the new starting time. The frames of the new shot may include any of the various modifications described herein as compared with the frames from the original shots, as indicated by the fact that the audio and video frames respectively are designated A' and V' rather than A and V. The read buffer then constructs the new footer. The new header, content, and footer are spliced together to construct the new output file for serving to the client. When the write thread detects that there is data in the buffer, the data is transmitted to the network for serving to the client.

Figure 7:
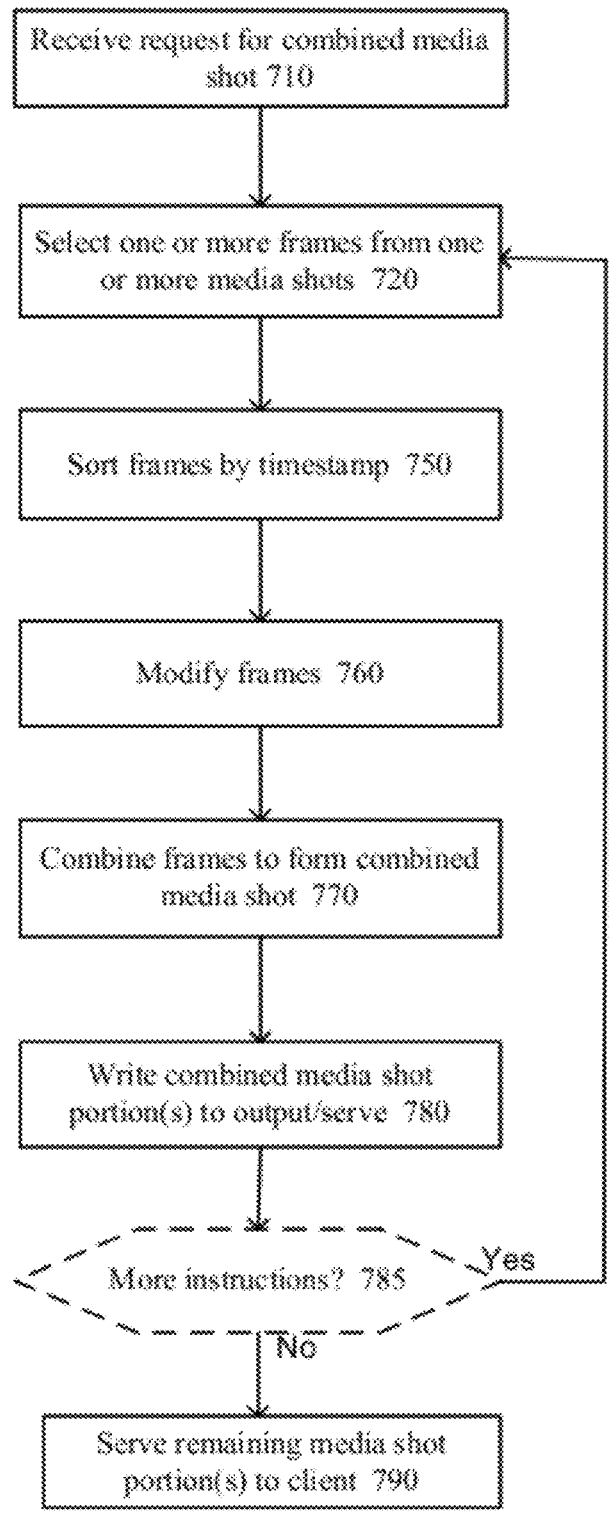
FIG. 7 is a flowchart illustrating a method for combining media shots.

FIG. 7 is a flowchart illustrating a method for combining media shots according to one embodiment of the present invention. The method begins when a request for a combined media shot is received 710 from a client at a server, for example, client 105 and server 110. The request includes similar characteristics to the request described in conjunction with FIG. 3. In addition, the request includes instructions for combining one or more media shots. The instructions specify various ways to combine media shots, such as interleaving one or more media shots, reversing one or more media shots, inserting an additional audio or text stream to a media shot, etc., according to various embodiments. The instructions also can contain ways to modify the media shots.

Once a request is received 710, at least one frame from at least one media shot is selected 720. At least one other frame from the same or a different media shot also is selected 720. The selections are made based on a content identifier, a time range, and other information included in the request from the client 105. Additional frames from the same or a different media shot optionally are selected. The files that include the selected frames are opened, and some or all of the file contents are read. The files are read sequentially in a single read thread per server request. More than one file or portions thereof can be read in multiple read threads to achieve higher performance, so long as timestamp ordering is maintained. If more than one read thread is used, each reads a different portion of a file, and the threads are coordinated to maintain the timestamp ordering such that the portions are send to the client in the correct order.

Each of the selected frames includes a timestamp. The selected frames are sorted 750 according to the timestamps. To do this, the timestamps are read by a thread and compared with each other. The selected frames may be arranged by their timestamps in ascending or descending order, e.g., using a sort algorithm. Any sort algorithm can be used to sort the timestamps, such as a bubble sort algorithm, an insertion sort algorithm, a shell sort algorithm, a merge sort algorithm, a heapsort algorithm, a quicksort algorithm, and a radix sort algorithm.

If the request includes instructions for modifying the combined media shot, the selected frame(s) may be modified 760 according to the instructions. The instructions can be in the form of an edit list as described in the detailed description of FIG. 3. Possible modifications may include data encryption, length modification, encoding rate modification, stream quantity modification, file wrapper format modification, video transformation processing, audio transformation processing, and a text or metadata insertion. Examples of these modifications are discussed in greater detail in conjunction with FIG. 3. The modifications can be applied to a portion or all of a media shot. The modifications can be applied to the selected frames before they are combined (as illustrated) or alternatively, to the frames in the combined media shot.

Next, the selected frames are combined 770 to form a new media shot according to the instructions in the request from the client 105. The server is adapted to combine the frames in any of a variety of ways, depending on the instructions in the edit list. One method of combining is to interleave the frames from one or more media shots. For example, the server 110 may take a video and audio stream pair from one media shot, and another video and audio stream pair from the same or a different media shot, and then combine the two pairs into a new media shot. The server 110 is also adapted to reverse one or more media shots, for instance, by sorting the timestamps of the frames in the media shot(s) in descending order. For example, the server 110 may take the last video and audio pair from a media shot and place it as the first video and audio pair in a new media shot. The server 110 is further adapted to insert an additional stream, e.g. an audio stream, a text stream, or a metadata stream, to an existing media shot at any arbitrary location therein. For example, the server 110 may take an audio stream and insert it into a video and audio stream pair from a media shot to form a new media shot, in which two audio streams are included for the client 105 to choose from. For example, a video advertisement could be inserted into a content stream, or audio, may be interleaved with a video stream.

The combined media shot, or a portion thereof, then is written 780 to an output medium and is served to the client. Portions of the combined media shot are served to the client when each portion is ready for serving. There is no need to wait for the entire combined media shot to be formed to serve it to the client. Then, it is determined 785 whether more instructions apply for the requested media content. If the request includes more instructions, steps 720-780 repeat according to the next instruction. Once all instructions are processed and the combined media shot is formed from the selected frames, the server 110 serves 790 any remaining portion of the combined media shot to the client 105.

Figures 8A, 8B:
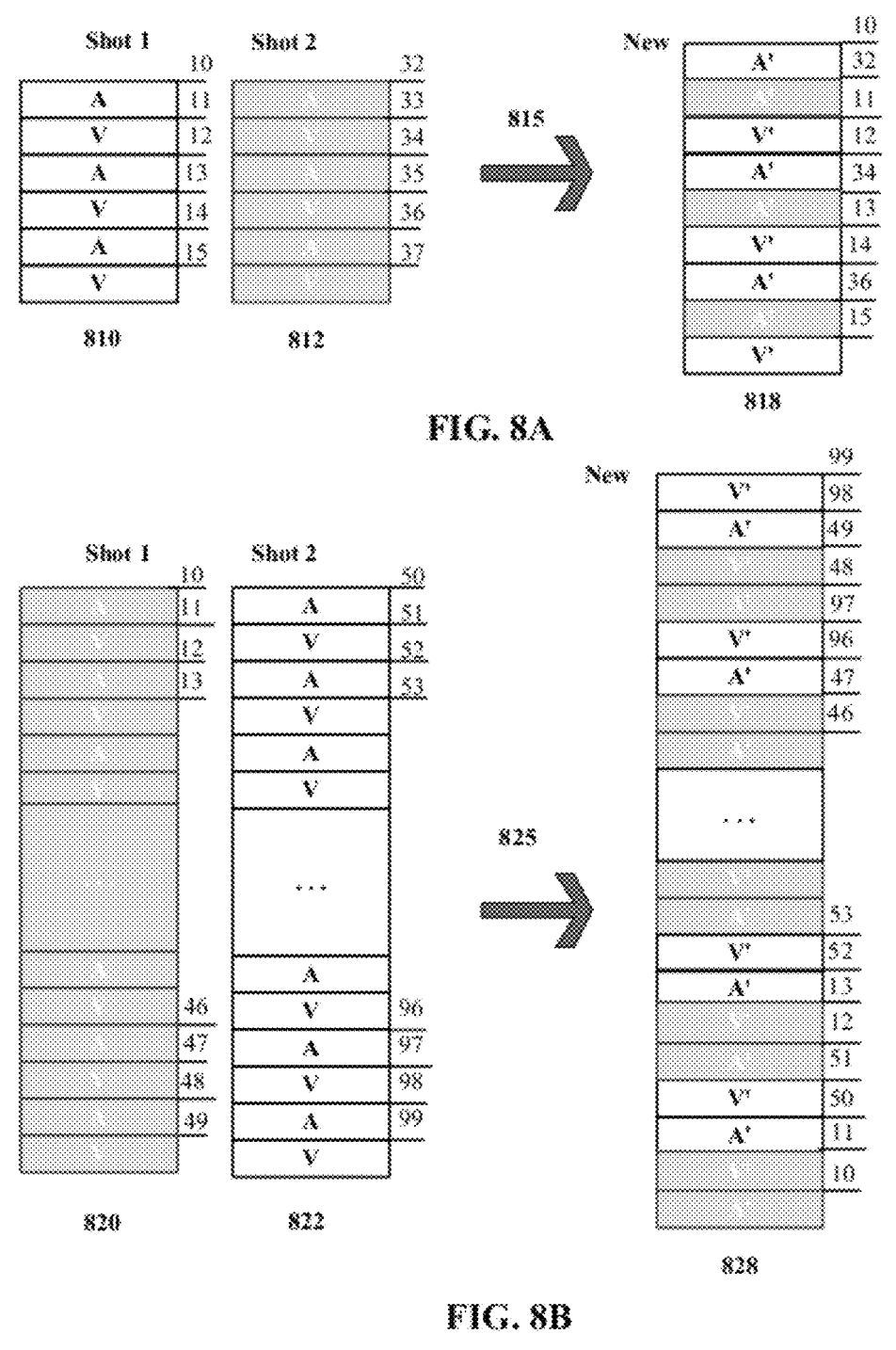
Figure 8C:
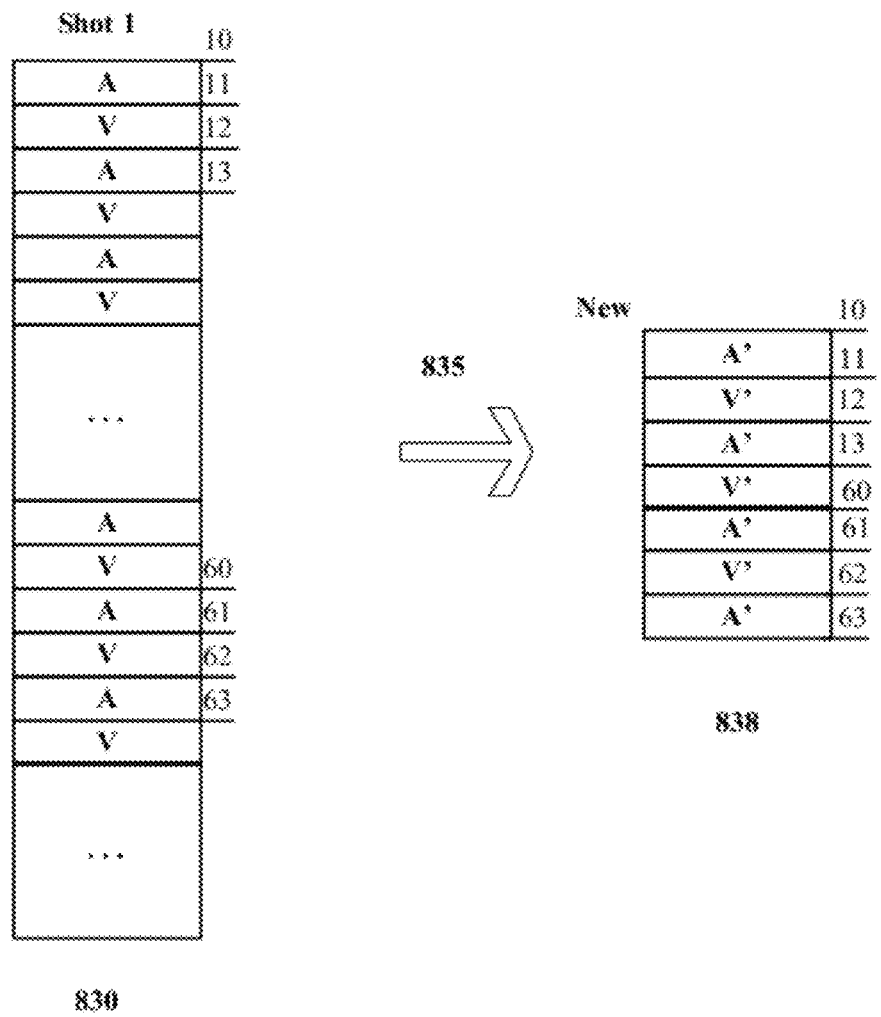

FIGS. 8A-8C show examples of use cases for the method described in FIG. 7. In these examples, streams from the same or different media shots are combined in various ways.

FIG. 8A shows an example in which a video and audio stream from shot 1 810 is interleaved with the audio frames from shot 2 812 to form a new combined media shot 818 according to an instruction list. In this example, the audio frame of shot 1 810 with timestamp "10" is first selected and written 815 to the output buffer to form a new combined media shot 818. Next, the audio frame of shot 2 812 with timestamp "32" is selected and written 815 to the output buffer. Subsequently, the video frame of shot 1 810 with timestamp "11" is selected and written 815 to the output buffer. Next, the audio frame of shot 1 810 with timestamp "12" is selected and written 815 to the output buffer. Thereafter, the audio frame of shot 2 812 with timestamp "34" is selected and written 815 to the output buffer. The server 110 continues to select the next frame in sequence until completing the last instruction that selects, in this example, the frames of shot 1 810 with timestamps "14" and "15" and the frame of shot 2 812 with timestamp "36." The frames of the new media shot 818 are renumbered and given new timestamps such that the timestamps in the new media increase monotonically from a new starting time. The frames of the new media shot 818 may include any of the various modifications described herein as compared to the frames in shot 1 810 and shot 2 812. For example, audio stream modifications, designated as A', may include pitch shift, bitrate adjustment, echo, reverse echo, flanger, crossfade, filtering, modulation, and compression. Video stream modifications, designated as V', may include black and white transformation, sharpening, blurring, arbitrary distortions, resolution reduction, noise reduction, and blending effects.

FIG. 8B shows an example in which a video and audio stream from shot 1 820 and a video and audio stream from shot 2 822 are reversed and interleaved to form a new combined media shot 828 according to an instruction list. In this example, a video and audio frame pair of shot 2 822 with the latest timestamps "99" and "98" is selected and written 825 to the output buffer in reverse order to form a new combined media shot 828, in which the frame with timestamp "99" is put before the frame with timestamp "98." Then, a video and audio frame pair of shot 1 820 with the latest timestamps "49" and "48" is selected and written 825 to the output buffer in reverse order. Next, a video and audio frame pair of shot 2 822 with the next latest timestamps "97" and "96" is selected and written 825 to the output buffer in reverse order. Thereafter, a video and audio frame pair of shot 1 820 with the next latest timestamps "47" and "46" is selected and written 825 to the output buffer in reverse order. The server 110 continues selecting and writing to the output buffer until completing the last instruction that selects 825, in this example, the video and audio frame pair with the earliest timestamps "10" and "11" from shot 1 820 and writes 825 it to the output buffer in reverse order. The frames of the new media shot 828 may include any of the various modifications described herein as compared to the frames in shot 1 820 and shot 2 822. Examples of these modifications are discussed in greater detail above in conjunction with FIG. 8A.

FIG. 8C shows an example in which two different portions of the same media shot from the same source media file are combined according to an instruction list. In this example, two video and audio frame pairs from a first portion of shot 1 830 with timestamps "10" through "13" are selected and written 835 to an output buffer. Next, two video and audio frame pairs from a second portion of shot 1 830 with timestamps "60" through "63" are selected and written 835 to an output. Depending on the instructions, the server 110 may select more or fewer than two frames from the first portion or the second portion of shot 1 830. The server 110 may also interleave the frames selected from the first portion and from the second portion to form a new combined media shot 838. In addition, the frames of the new media shot 838 may include any of the various modifications described herein as compared to the frames in shot 1 830. Examples of these modifications are discussed in greater detail in conjunction with FIG. 8A.

Thus, the present invention provides for dynamic generation of media content by a server on-the-fly from a corpus of indexed data source files. The system and method use simple, existing, open protocols, such as HTTP, and standards compliant video encodings, such as MPEG-4 and h.263. The media files served are playable by standard media playback clients. The method uses an edit list, or instruction list, received as part of a request for media content from a client. The server selects portions of the source media file(s) to transmit, and dynamically modifies the content before serving. The server sorts the selected portions of the source media file(s), combines the selected portions to form a combined media shot, and serves the combined media shot to the client.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for combining media shots on a server, comprising:
   receiving at the server a request from a client for a combined media shot, the request comprising at least one content identifier and instructions for combining a first set of frames from a first media shot with a second set of frames from a second media shot, the instructions comprising a starting time and a time length corresponding to the first media shot;
   combining at the server the first set of frames and the second set of frames to form a portion of the combined media shot, wherein the combined media shot comprises a plurality of portions;
   creating a header for the combined media shot describing the combined media shot; and
   serving from the server the portion of the combined media shot to the client prior to completing formation of all of the plurality of portions of the combined media shot.

2. The method of claim 1, wherein the instructions further comprise a content transformation instruction.

3. The method of claim 2, wherein the content transformation instruction is applied to the first media shot.

4. The method of claim 2, wherein the content transformation instruction is applied to the combined media shot.

5. The method of claim 1, wherein each frame in the first set of frames and the second set of frames each correspond to a timestamp.

6. The method of claim 5, further comprising sorting each frame in the first set of frames and the second set of frames according to the timestamps corresponding to each frame.

7. The method of claim 6, wherein sorting each frame comprises sorting the timestamps in ascending order.

8. The method of claim 6, wherein sorting each frame comprises sorting the timestamps in descending order.

9. The method of claim 1 further comprising combining at the server a third set of frames from a third media shot with the combined media shot.

10. The method of claim 1, wherein the first media shot and the second media shot are selected from one source media file.

11. The method of claim 1, wherein the first media shot and the second media shot are selected from two different source media files.

12. The method of claim 1, wherein the first set of frames comprises frames selected from a group consisting of a video stream, an audio stream, a text stream, and a metadata stream.

13. The method of claim 1, wherein the first media shot comprises video, and wherein the second media shot comprises video.

14. The method of claim 1, wherein the first media shot comprises video, and wherein the second media shot comprises audio.

15. The method of claim 1, wherein the client and the server reside on a single device.

16. The method of claim 1, further comprising creating a format-applicable footer describing the combined media shot.

17. The method of claim 1, further comprising:
   modifying the first set of frames and/or the second set of frames corresponding to the request.

18. The method of claim 17, wherein modifying the first set of frames and/or the second set of frames comprises an alteration selected from a group consisting of a data encryption, a length modification, an encoding rate modification, a stream quantity modification, a file wrapper format modification, a video transformation processing, an audio transformation processing, and a metadata insertion.

19. A computer program product for combining media shots on a server, the computer program product comprising:
   a non-transitory computer-readable storage medium; and
   computer program code, coded on the storage medium, for:
      receiving at the server a request from a client for a combined media shot, the request comprising at least one content identifier and instructions for combining a first set of frames from a first media shot with a second set of frames from a second media shot, the instructions comprising a starting time and a time length corresponding to the first media shot;
      combining at the server the first set of frames and the second set of frames to form a portion of the combined media shot, wherein the combined media shot comprises a plurality of portions;
      creating a header for the combined media shot describing the combined media shot; and
      serving from the server the portion of the combined media shot to the client prior to completing formation of all of the plurality of portions of the combined media shot.

20. The computer program product of claim 19, wherein the instructions further comprise a content transformation instruction.

21. The computer program product of claim 19, wherein the computer program code further comprises code to create a format-applicable footer describing the combined media shot.

22. The computer program product of claim 19, wherein the client and the server reside on a single device.

23. A system for combining media shots on a server, comprising:

means for receiving at the server a request from a client for a combined media shot, the request comprising at least one content identifier and instructions for combining a first set of frames from a first media shot with a second set of frames from a second media shot, the instructions comprising a starting time and a time length corresponding to the first media shot;

means for combining at the server the first set of frames and the second set of frames to form a portion of the combined media shot, wherein the combined media shot comprises a plurality of portions;

means for creating a header for the combined media shot describing the combined media shot; and means for serving from the server the portion of the combined media shot to the client prior to completing formation of all of the plurality of portions of the combined media shot.

24. The system of claim 23, wherein the instructions further comprise a content transformation instruction.

25. The system of claim 23, further comprising means for creating a format-applicable footer for the combined media shot describing the combined media shot.

26. The system of claim 23, wherein the client and the server reside on a single device.

\* \* \* \* \*